US006754648B1

(12) United States Patent
Fittges et al.

(10) Patent No.: US 6,754,648 B1
(45) Date of Patent: Jun. 22, 2004

(54) METHOD FOR STORING AND MANAGING DATA

(75) Inventors: Klaus Fittges, Cologne (DE); Jurgen Harbarth, Darmstadt (DE); Harlad Schoning, Dieburg (DE); Horst Kinzinger, Reinheim (DE)

(73) Assignee: Software AG, Darmstadt (DE)

( * ) Notice: Subject to any disclaimer, the term of this patent is extended or adjusted under 35 U.S.C. 154(b) by 273 days.

(21) Appl. No.: 09/668,612

(22) Filed: Sep. 22, 2000

(30) Foreign Application Priority Data

Sep. 30, 1999 (EP) .......................................... 99119447

(51) Int. Cl.[7] .............................................. G06F 17/30
(52) U.S. Cl. ........................ 707/1; 707/100; 707/102; 715/501.1; 715/513; 715/514
(58) Field of Search ............................ 707/1, 100–102; 715/513–514, 501.1

(56) References Cited

U.S. PATENT DOCUMENTS

| | | | | |
|---|---|---|---|---|
| 5,911,145 A | * | 6/1999 | Arora et al. ................. | 707/514 |
| 5,970,490 A | * | 10/1999 | Morgenstern ................. | 707/10 |
| 6,125,391 A | * | 9/2000 | Meltzer et al. .............. | 709/223 |
| 6,330,554 B1 | * | 12/2001 | Altschuler et al. ............ | 706/21 |
| 6,342,907 B1 | * | 1/2002 | Petty et al. .................. | 345/762 |
| 6,356,920 B1 | * | 3/2002 | Vandersluis ............... | 707/501.1 |
| 6,366,934 B1 | * | 4/2002 | Cheng et al. ................ | 707/513 |
| 6,480,860 B1 | * | 11/2002 | Monday ....................... | 707/102 |
| 6,510,434 B1 | * | 1/2003 | Anderson et al. ........... | 707/100 |
| 6,675,353 B1 | * | 1/2004 | Friedman .................... | 715/513 |

OTHER PUBLICATIONS

Daniela Florescu, "A Performance Evaluation of Alternative Mapping Schemes for Storing XML Data in a Relational Database", Technical Report 3684, INRIA, Mar. 1999.*

Kasukawa et al., "A New Method for Maintaining Semi-Structured Data Described in XML", 1999 IEEE, pp. 258–261.

Nestorov et al., "Representative Objects: Concise Representations of Semistructured, Hierarchical Data", 1997 IEEE, pp. 79–90.

Pons et al., "Medical Database Migration Using New XML Internet Standard", 1999 IEEE, pp. 93–96.

* cited by examiner

*Primary Examiner*—Safet Metjahic
*Assistant Examiner*—Hanh Thai
(74) *Attorney, Agent, or Firm*—Meyertons Hood Kivlin Kowert & Goetzel, P.C.; Jeffrey C. Hood

(57) ABSTRACT

A method for storing and managing data on a storage medium connected to a computer system, wherein the data consists of a plurality of data elements and a plurality of tags, wherein each of the data elements is assigned one of the tags to form a plurality of pairs each consisting of at least one of the data elements and one of the tags, wherein each of the pairs is assigned a position in a hierarchical structure, wherein each of the pairs is stored and managed on the storage medium together with a pair-individual hierarchy indicator indicating the position of the pair in the hierarchical structure. Furthermore, a computer program for carrying out this method and a data carrier storing such a program are provided.

24 Claims, 4 Drawing Sheets

METHOD FOR STORING AND MANAGING DATA

FIELD OF THE INVENTION

The present invention relates generally to database software, and more particularly to relational databases.

DESCRIPTION OF THE RELATED ART

Employing computer systems allows management of large amounts of data. This data is generally stored in databases. These databases comprise of a storage unit for storing this data. The storage unit may be any suitable storage medium, such as a hard disk. The storage unit and the data stored thereon are managed by a computer application, referred to as database software. The storage unit is controlled by a computer system on which the database software is run.

Prior art databases are mostly relational databases. These databases are organized as a set of formally-described tables from which data can be accessed or reassembled in many different ways without having to reorganize the database table. The tables are also called relations.

The sets of tables contain data organized into predefined categories. Each table contains one or more data categories in columns. Each row contains a unique instance of data for the categories defined by the columns. For example, a typical address book database may include a table that describes a "contact" with the name, surname, street, city, telephone number and birthday. A user of the database could obtain a view of the database that meets the user's needs; for example, the "contact" may be described only by surname, telephone number and birthday.

While creating a relational database, the domain of possible values in a data column and further constraints that may apply to that data value have to be defined. The definition of a relational database results in a table of metadata or formal description of the tables, columns, domains and constraints.

Such a relational database has the advantage of being relatively easy to create and access. Relational databases are also relatively easy to extend, because after the original database creation, a new data category can be added without requiring that all existing applications be modified. The standard user and application program interface to a relational database is the structured query language (SQL).

One disadvantage of relational databases is that their data storage structure is flat. All information of the database is stored in the relations. The structure between the relations is not stored. This means that information contained in these structures of the data is lost for the database when the data is stored. Another disadvantage of the prior art is that these databases require the set up of schemas by the database administrator to define the categories of the columns in the tables. This is laborious and confusing, since it may differ between the various databases. This is particularly unpleasant if several databases are to be brought into cooperation.

In the prior art object oriented databases are also known. These comprise objects and classes to which these objects belong. The objects may include values as well as methods. The classes refer to characteristics of objects relating to their potential further processing or handling. However, the classes are not related to the content of data as such, and therefore do not facilitate the management of the data with respect to the substantive information contained therein.

SUMMARY OF THE INVENTION

One object of the present invention is to overcome these disadvantages and to provide a database which is easy to manage, particularly with respect to the substantive information contained in the database.

These and other objects are achieved by a method for storing and managing data on a storage medium connected to a computer system, wherein said data comprises a plurality of data elements and a plurality of tags, wherein each of said data elements is assigned one of said tags to form a plurality of pairs each comprising at least one of said data elements and one of said tags, wherein each of said pairs is assigned a position in a hierarchical structure, characterized in that each of said pairs is stored and managed on said storage medium together with a pair-individual hierarchy indicator indicating said position of said pair in said hierarchical structure.

A computer system which is able to carry out this inventive method comprises a processor, a storage medium, an input device and an output device. The storage medium can be a hard disk or other storage medium. This storage medium, as well as the input device and the output device, may be comprised in the computer system itself, or in another embodiment, may belong to another computer system and be connected via a data line or a network to the computer system.

The data to be stored and managed by employing this computer system may be divided into data elements and tags. In connection with an address database example, the data elements or entries would be the first name, the surname, the street, the house number, the city, the telephone numbers, the birthday and any other data element. These data elements are organized in relation to the tags. The tags describe the content of the corresponding data elements. For example, the data elements which belong to the tag "street" contain the information about the name of a street. Since these tags are organized in a hierarchical structure, the tags "street", "house number" and "city" may belong to another tag, for example the tag "address", which could be called a parent tag.

In connection with one embodiment of the present invention, storing describes the process of inserting new entries into the database, for example, a new contact in the address database, and managing describes the process of handling the various entries, like viewing, opening, amending and transmitting.

By means of the present invention the hierarchical structure of data may be conserved in the database, which means it is not lost for the database. This is achieved by employing a pair-individual hierarchy indicator indicating the position of the corresponding pair in the hierarchical structure, and being stored and managed together with the respective pair. Herein, a pair-individual hierarchy indicator may indicate the position of its related pair by describing the parent and the child(ren) of this pair in the hierarchical structure. However, this pair-individual hierarchy indicator may contain, in addition or instead, other information, for example about the grandparent, grandchildren or other relationships to other pairs in the hierarchical structure. Therefore, the pair-individual hierarchy indicator may also be called relationship attribute. Further additional information may be expressed by other attributes, for example the data type of the data element by a so-called content attribute.

By using the pair-individual hierarchy indicator in the mentioned way the method of the present invention allows the information about a pair relating to its position in the hierarchical structure to be maintained when storing this pair in a database and when further processing this pair in or in connection with this database.

In a preferred embodiment of the present invention each of the pairs is listed in an index, wherein this index contains hierarchy information about the position of each of the pairs in the hierarchical structure. This index may be initiated with the storage of the first pair and may be updated with each change in the database, for example with the storing of a new pair, with amending or changing the hierarchical position of an existing pair, or with deleting a pair from the database.

This index contains information about the data, i.e., about each data element or each pair of data elements and tags. In the scope of the present invention the index contains at least the information about the position of each data element or pair in the hierarchical structure. Therefore, the index reflects this hierarchical structure. However, according to the present invention the index may also contain additional information which could be of interest to the user, such as information related to the content of the data elements as well as information corresponding to the creation of this data element, like the storing date or the name of the author.

As a consequence, the index allows quick location of each data element or pair, respectively. In order to improve the search function, combined indexes may be also provided, this means indexes which contain hierarchical information as well as content information regarding the data elements. Information about the data element or pair is available from the index without accessing this data element or pair, because this information can be gathered from the hierarchical structure in which the pairs are arranged. For example, it is possible to find out from the index of the database if the number 16 belongs to the address, the data of birth or to the telephone number of an entry of the database.

It is preferred that the hierarchy information in the index includes the pair-individual hierarchy indicators for each pair. This may facilitate the administration of the database in that the information stored and managed together with the pairs is identical with the information registered in the index.

Preferably, said managing of said pairs comprises searching through said data on demand of a user of said computer system using a searching function allowing the following searching schemas: performing a search in said data elements, performing a search in said tags, and performing an interconnected search in said data elements and in said tags. Such a search can be carried out quickly by employing the index which reflects the hierarchical structure of the data. All necessary information needed for this kind of search can be found in this index. This kind of managing allows the user to employ the structure for achieving a better search result in less time. For example, prior art address databases allow searching for the first name of a contact. If such a contact has several first names no hierarchy between these first names is established and can be taken into account, unless the category first name is generally, that means for all contacts, subdivided into more than one first name, i.e. calling name, second name, third name, etc. A search function according to the prior art without additional subdividing between the calling, second and third name will present all contacts with the searched first name, no matter if it is the calling, second or third name.

The method of the present invention now allows the system to directly access, for example, the second name of contacts without having to introduce further categories or distinctions, simply by following the paths of the hierarchical structure, which is reflected in the index. In this example, the structure might, in a tree-like fashion, use "first name" as a branch and store therein several first names in the natural sequence of the address data. Thereby, the second or third first name may easily be searched. Frequently, the search is also faster. Regularly, this kind of search leads to more accurate results.

Preferably, said managing of said pairs comprises automatically initializing a routine when a predefined event occurs. It is further preferred that the predefined event can be a result obtained by means of a searching function. However, the predefined event may be any occurrence defined by the system administrator. The event may be defined in the database application as well as in an external application being in contact with the database application. For example, it may be desired that employees automatically receive birthday greetings on their personal birthday. In this case the event would be that a pair consisting of the tag birthday and the figures representing the birthday date of an employee equal the pair consisting of the tag birthday and the present date. The routine would be the automatic creation and dispatch of birthday greetings, potentially with the facsimile signature of the president of the company. In many applications, of course, the predefined event will be a request initiated by another system part, i.e., internally, or by a user, i.e., externally.

Another preferred feature in the management of data according to the inventive method is the displaying of the hierarchical structure of said pairs on an output device, for example a screen or a printer. This display of the hierarchical structure shows the hierarchy, preferably in the form of a tree-like representation, and allows a user to obtain an extremely quick overview of the data structure. This display facilitates the orientation in the database. It is supplemented by another optional feature of the present invention, namely the placing of data elements at any position in said hierarchical structure according to the interaction of a user. This placing may also be a re-placing, that means a change of position in the hierarchy. For example, in an address database the private address is presently considered less relevant than the business address, however, for the future this may be changed. Then it is comparably easy, when utilizing the present invention, to rearrange the private address at a place higher in the hierarchy than the business address. As stated before, the display of the structure facilitates this process, however, it is not necessary.

Another preferred method according to the present invention includes the management of the pairs of tags and data elements comprising an undo function for undoing storing and managing actions. The undo function allows cancellation of actions performed by the computer system on the storage medium, for example, the deletion of a certain pair, to remove their effect, thus keeping the stored pair.

Preferably, the data is formated in the extensible markup language (XML) format. Data thus formatted disposes of a hierarchical structure of the information and renders it easier to store this information in a database, i.e. on a storage medium, because the XML format forms a common platform which may be more easily understood by the software application managing the storage medium.

It is also preferred in the scope of the present invention that the computer system controlling the storage medium is connected to various storage mediums via a data connection, thereby enlarging storage space and rendering the database application faster. This data connection may be any link allowing the transfer of data, be it permanent or temporary.

The present invention further relates to a computer program being stored on any computer readable memory means for carrying out a method according to the present invention on a computer system, which may be a standard computer system.

In the scope of the present invention a data carrier with a computer program for carrying out a method according to the present invention on a computer system is also provided.

The present invention relates also to a database system which uses any of the above disclosed methods for storing and managing data.

Finally, the present invention relates to a method for using a computer system for carrying out a method according to any of the inventive methods for storing and managing data according to this invention.

BRIEF DESCRIPTION OF THE DRAWINGS

In the following, a preferred embodiment of the present invention is exemplary described in connection with the FIGS. 1 to 5, wherein.

DETAILED DESCRIPTION OF THE EMBODIMENTS

In one embodiment, the method according to the present invention may be utilized for storing and managing data of a hospital's patients. It is understood that this exemplary description does not limit the use of the present invention to any specific kind of data. This database includes entries about personal details of the patients, their diagnosis and information about the treating doctors.

Each set of patient data may be subdivided into the sections personal patient information, diagnosis and information about treating doctors. Each section may contain subsections, for example, in the section personal patient information, the name, address, phone number or date of birth. Each subsection may contain sub-subsections, and so forth. The sections, subsections and so forth are arranged in a hierarchical structure, wherein cross-connections may or may not exist. Each pair, consisting of data elements and a tag, will be assigned a position in this hierarchical structure.

In the present example the data may be formatted in the XML format. The structure of the data is defined by employing XML Document Type Definitions (DTDs). These DTDs define at least the tags and the hierarchical structure between the pairs having a certain tag. The structure of the data will be defined by employing software applications for creating data structures.

Figure 1:
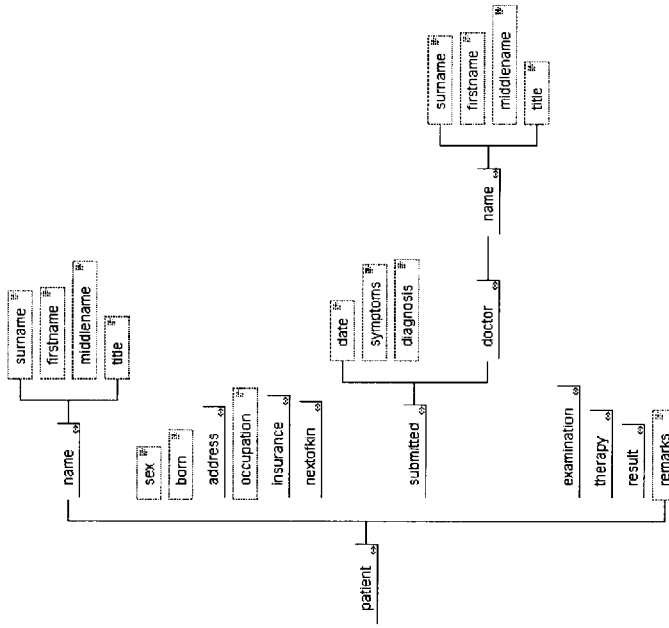
FIG. 1: shows an example of an XML Document Type Definition (DTD)

FIG. 1 shows an example of such an XML Document Type Definition (DTD). In the left frame of FIG. 1 the tree-like structure of the hospital's patients data is presented. The data element patient is subdivided into sub-data elements called name, sex, birthday, address, occupation, insurance, next of kin, submitted, examination, therapy, result and remarks. Each of these sub-data elements may have further sub-data elements like the data element name which is subdivided in the present example into the elements surname, firstname, middlename and title. Sub-data elements are considered to be data elements in the context of the present invention.

In the right frame of FIG. 1 a description of the corresponding structure in XML is shown. The description starts with a definition of the content of the DTD. After that the entity and the elements are defined. In the present example in FIG. 1 the data elements name, sex, born, address, occupation, insurance and next_of_kin are combined in one entity called personal data.

Figure 2:
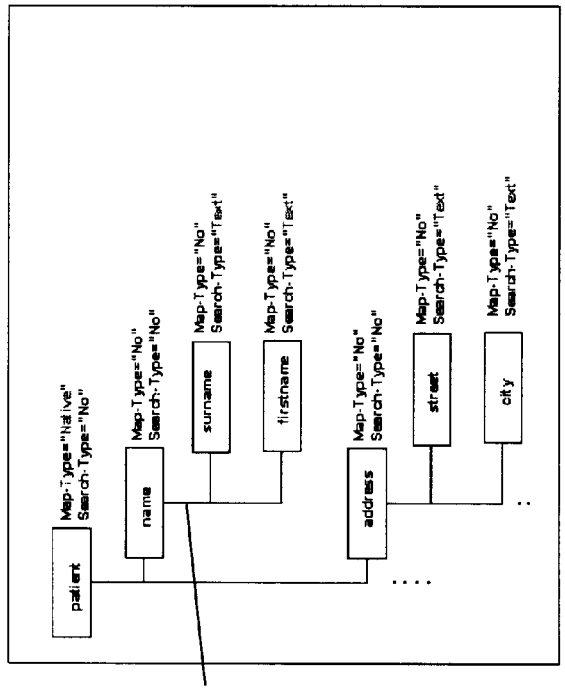
FIG. 2: shows an example of a schema definition.

In addition, schemas are defined to express the structure of the data and to specify where the data is stored and how it can be retrieved. FIG. 2 shows an example for such a scheme. In the scheme all relevant tags are described by XML elements, called nodes. The additional information for storing (mapping) and retrieving (indexing) the data elements is expressed by attributes of the data elements. These attributes include identification attributes, such as the name and the key of the tag, relationship attributes, which indicate the key of the parent element like the pair-individual hierarchy indicator, and content attributes, which give information about the data type of a data element. In addition, special storing and retrieving attributes are responsible for defining the corresponding storing and retrieving functions. The storing functions indicate where and in which format a data element is stored in a database. The retrieving functions specify the entry of data elements into the index. The scope of indexing depends on user requirements, for example, only the rough position of each of the pairs in the hierarchical structure may be registered in the index. The index may, however, also contain information about the content of data elements, thereby enabling the user, for example, to perform a text search—perhaps even a full text search—in the index of pairs containing data elements comprising text. The suitable indexing of the data elements is preferred for good and quick retrieval of data.

Figure 3:
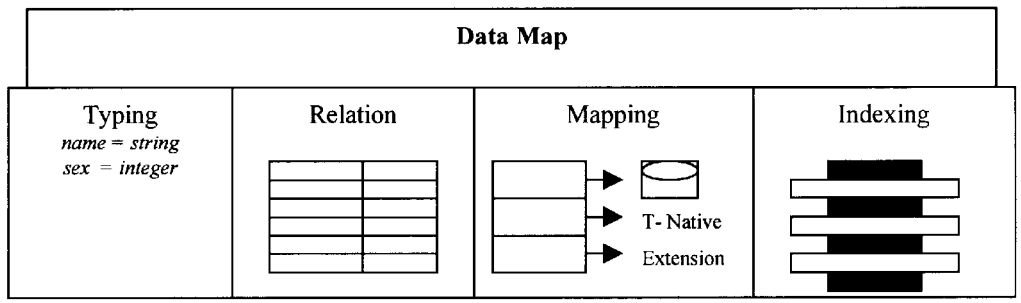
FIG. 3: is a diagram representing a data map.

The schema definitions are stored in the data map, also called repository, which delivers optimized data paths to this information. FIG. 3 shows an example for the structure of such a data map.

Figure 4:
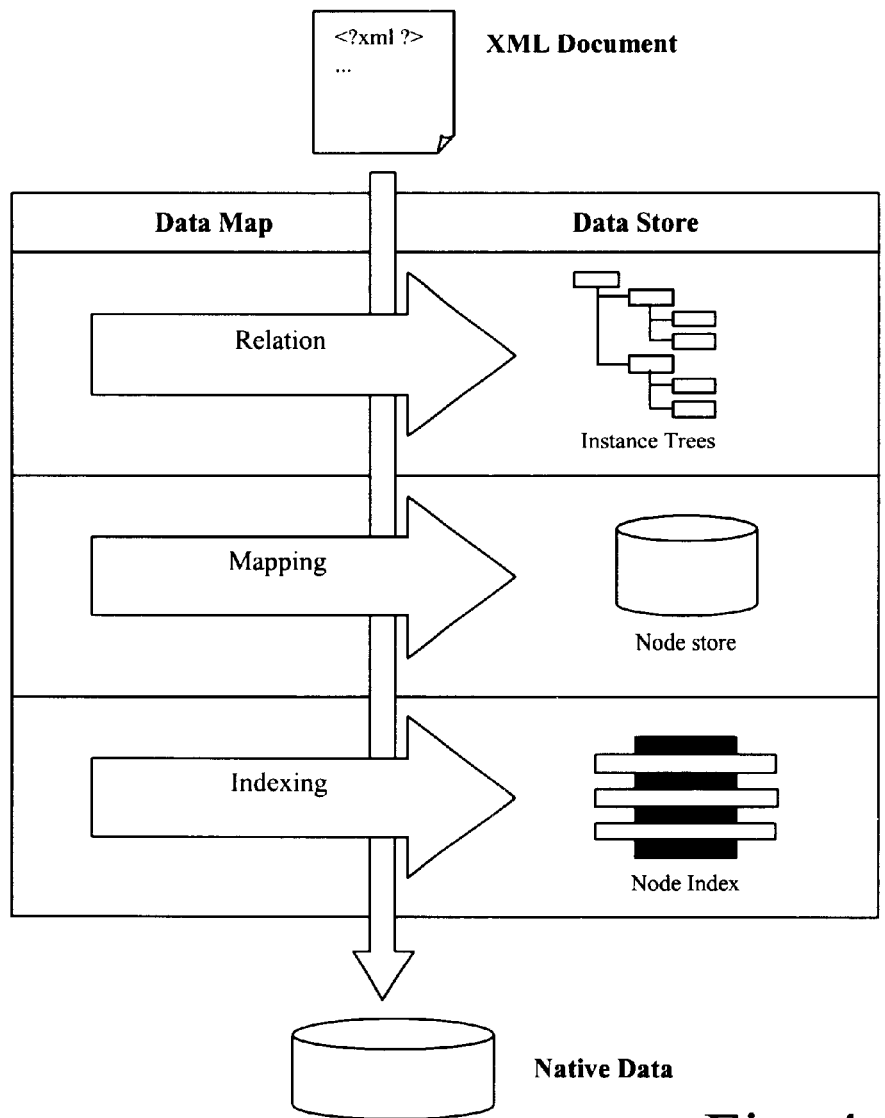
FIG. 4: is a diagram representing the process of storing data in the database.

When a new set of patient data is stored in the database, the data will pass a disassembling function, which is described in FIG. 4. This disassembling function organizes the set of patient data into one or more pairs, each consisting of at least one data element and a tag. In the present example, each set of patient data will be subdivided into the sets, personal patient information, diagnosis, and information about treating doctors. Each set will contain sub-sets of data, for example, in the set personal patient information, the name, address, phone number or date of birth. Each pair, consisting of a data element and a tag, will be assigned a position in this hierarchical structure and then stored in a relational map which contains all information of every instance. Every node of each instance will be stored on a dedicated data unit during the mapping. This could be internal, such as a data structure optimized for retrieval, or any external datasource—a database or functions, provided by an extension framework. For example the doctors name could be provided by the hospital's personal information system.

Then, the pairs are processed by an index function, which creates and updates an index of all pairs stored in the database. Indexing is the way to optimize the search in the content of a node. As nodes in their semantics have different meanings, different kinds of indexing are provided. On some kind of nodes full-text retrieval is required, while some nodes only contain single words. The suitable indexing of the data elements is preferred for good and quick retrieval of data. The "medication" information, for example, might require a full-text search to allow a search for words. This indexing is carried out according to the above-mentioned retrieving functions. The pairs are now stored, together with the respective pair-individual hierarchy indicator in the database, according to the above addressed storing functions.

If a user of the patient database, for example a nurse, wishes to search the database for all patients undergoing treatments with medicaments whose names contain "cardio" together with "mycin", e.g. "Iso-cardio-alpha-mycin", then this would be highly complicated with prior art databases. A search would have to be performed through all sets of patient data, eventually the "medicament" parts in the appropriate tables would have to be searched with a separate path for names containing "cardio"; in most cases this would have to be done by application logic, because this is not a normal part of prior art database systems.

The present invention of storing and managing data allows to perform a combined structure-based and content-based search at the same time, i.e. a search specifically and directly in the pairs of the sets of patient data which have the tag medicament with a value containing "cardio" somewhere and "mycin" somewhere else. This is possible by the combined indexes maintained by the present invention. If then additional information is required about the diagnosis of those patients treated with the specific medicaments, the database may easily be searched in a similar way for the pairs with a tag relating to the diagnosis or special indication of the patients.

Figure 5:
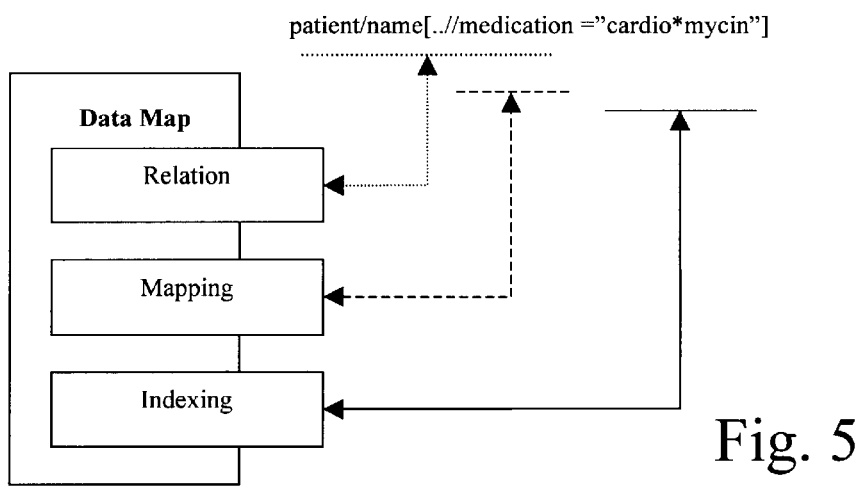
FIG. 5: is a diagram representing a combined search.

FIG. 5 shows a diagram representing such a combined search. With the additional information of the data map a query could split up in parts, which could be evaluated separately, based on the different information types like relation, mapping and indexing.

This example shows that the inventive method improves the storing and managing of data in a database.

Figure 6:
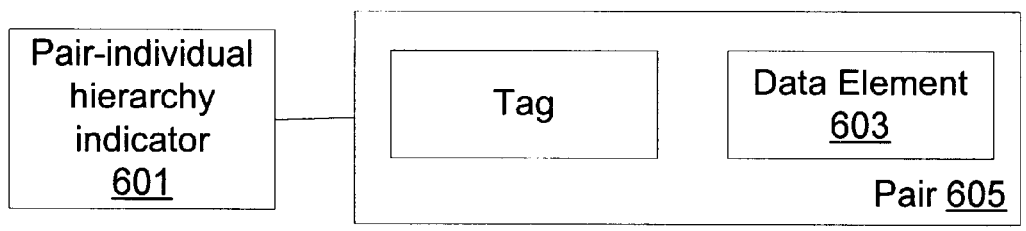
FIG. 6: is a diagram representing a pair-individual hierarchy indicator and pair.

Referring to FIG. 6, by means of the present invention the hierarchical structure of data may be conserved in the database, which means it is not lost for the database. This is achieved by employing a pair-individual hierarchy indicator 601 indicating the position 201 (see FIG. 2) of the corresponding pair 605 in the hierarchical structure, and being stored and managed together with the respective pair 605. Herein, a pair-individual hierarchy indicator 601 may indicate the position of its related pair 605 by describing the parent and the child(ren) of this pair 605 in the hierarchical structure. However, this pair-individual hierarchy indicator 601 may contain, in addition or instead, other information, for example about the grandparent, grandchildren or other relationships to other pairs in the hierarchical structure. Therefore, the pair-individual hierarchy indicator 601 may also be called relationship attribute. Further additional information may be expressed by other attributes, for example the data type of the data element 603 by a so-called content attribute.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method, comprising:
    assigning a tag of a plurality of tags to each of a plurality of data elements to form a plurality of pairs, each of said pairs comprising at least one of said data elements and one of said tags;
    assigning each of said pairs a position in a hierarchical structure; and
    storing and managing the pairs on a computer readable medium coupled to a computer system, wherein each of said pairs is stored and managed on said computer readable medium together with a pair-individual hierarchy indicator indicating said position of said pair in said hierarchical structure;
    wherein said storing and managing comprises listing each of said pairs in an index, wherein said index contains hierarchy information about said position of each of said pairs in said hierarchical structure.

2. A method according to claim 1, wherein said hierarchy information includes said pair-individual hierarchy indicator for each of said pairs.

3. A method according to claim 1, wherein said managing the pairs comprises searching through said pairs in response to user input using a searching function allowing the following searching schemas: performing a search in said data elements, performing a search in said tags, performing an interconnected search in said data elements and in said tags.

4. A method according to claim 3, wherein, if said data elements comprise text portions, said search in said data elements is performed by searching said text portions fully.

5. A method according to claim 1, wherein said managing of said pairs comprises automatically initializing a routine when a predefined event occurs.

6. A method according to claim 5, wherein said predefined event is a result obtained by means of a searching function or a storing function.

7. A method according to claim 1, wherein said managing of said pairs comprises displaying said hierarchical structure of said pairs on an output device.

8. A method according to claim 1, wherein each of said data elements is operable to be positioned at any place in said hierarchical structure in response to user input.

9. A method according to claim 1, wherein said managing of said pairs comprises performing an undo function for undoing storing and managing actions.

10. A method according to claim 1, wherein said pairs are formatted in the XML format.

11. A method according to claim 1, wherein said computer system is connected to various storage mediums via a data connection.

12. A computer-readable carrier medium comprising program instructions, wherein the program instructions are executable to implement:
    assigning a tag of a plurality of tags to each of a plurality of data elements to form a plurality of pairs, each of said pairs comprising at least one of said data elements and one of said tags, wherein each of said pairs is assigned a position in a hierarchical structure; and
    storing and managing the pairs on a computer readable medium connected to a computer system, wherein each of said pairs is stored and managed on said computer readable medium together with a pair-individual hierarchy indicator indicating said position of said pair in said hierarchical structure;
    wherein said storing and managing further comprises listing each of said pairs in an index, wherein said index contains hierarchy information about said position of each of said pairs in said hierarchical structure.

13. The computer-readable carrier medium of claim 12, wherein said hierarchy information includes said pair-individual hierarchy indicator for each of said pairs.

14. The computer-readable carrier medium of claim 12, wherein said managing the pairs comprises searching through said pairs in response to user input using a searching function allowing the following searching schemas: performing a search in said data elements, performing a search in said tags, performing an interconnected search in said data elements and in said tags.

15. The computer-readable carrier medium of claim 14, wherein, if said data elements comprise text portions, said search in said data elements is performed by searching said text portions fully.

16. The computer-readable carrier medium of claim 12, wherein said managing of said pairs comprises automatically initializing a routine when a predefined event occurs.

17. The computer-readable carrier medium of claim 12, wherein said predefined event is a result obtained by means of a searching function or a storing function.

18. The computer-readable carrier medium of claim 12, wherein said managing of said pairs comprises displaying said hierarchical structure of said pairs on an output device.

19. The computer-readable carrier medium of claim 12, wherein each of said data elements is operable to be positioned at any place in said hierarchical structure in response to user input.

20. The computer-readable carrier medium of claim 12, wherein said managing of said pairs comprises performing an undo function for undoing storing and managing actions.

21. The computer-readable carrier medium of claim 12, wherein said pairs are formatted in the XML format.

22. A computer-readable carrier medium, wherein the carrier medium stores:

a plurality of data elements and a plurality of tags, wherein each of said data elements is assigned one of said tags to form a plurality of pairs each comprising at least one of said data elements and one of said tags, wherein each of said pairs is assigned a position in a hierarchical structure; and program instructions, wherein the program instructions are executable to perform storing and managing said pairs together with a pair-individual hierarchy indicator indicating said position of said pair in said hierarchical structure;

wherein said storing and managing comprises listing each of said pairs in an index, wherein said index contains hierarchy information about said position of each of said pairs in said hierarchical structure.

23. A computer-readable carrier medium, comprising a plurality of pairs each comprising at least one of a plurality of data elements and one of a plurality of tags, wherein each of said data elements is assigned one of said tags, wherein each of said pairs is assigned a position in a hierarchical structure; and program instructions, wherein the program instructions are executable to perform storing and managing said pairs together with a pair-individual hierarchy indicator indicating said position of said pair in said hierarchical structure;

wherein said storing and managing comprises listing each of said pairs in an index, wherein said index contains hierarchy information about said position of each of said pairs in said hierarchical structure.

24. A system, comprising:

a processor;

a computer readable memory medium coupled to the processor, wherein the computer readable memory medium stores program instructions that are executable to implement:

assigning a tag of a plurality of tags to each of a plurality of data elements to form a plurality of pairs, each of said pairs comprising at least one of said data elements and one of said tags, wherein each of said pairs is assigned a position in a hierarchical structure; and storing and managing the pairs on a computer readable medium coupled to a computer system, wherein each of said pairs is stored and managed on said computer readable medium together with a pair-individual hierarchy indicator indicating said position of said pair in said hierarchical structure;

wherein said storing and managing comprises listing each of said pairs in an index, wherein said index contains hierarchy information about said position of each of said pairs in said hierarchical structure.

\* \* \* \* \*